T. W. McNALLY, Jr.
THEFT PREVENTION DEVICE FOR AUTOMOBILES.
APPLICATION FILED MAR. 9, 1917.
1,249,798.
Patented Dec. 11, 1917.
2 SHEETS—SHEET 1.
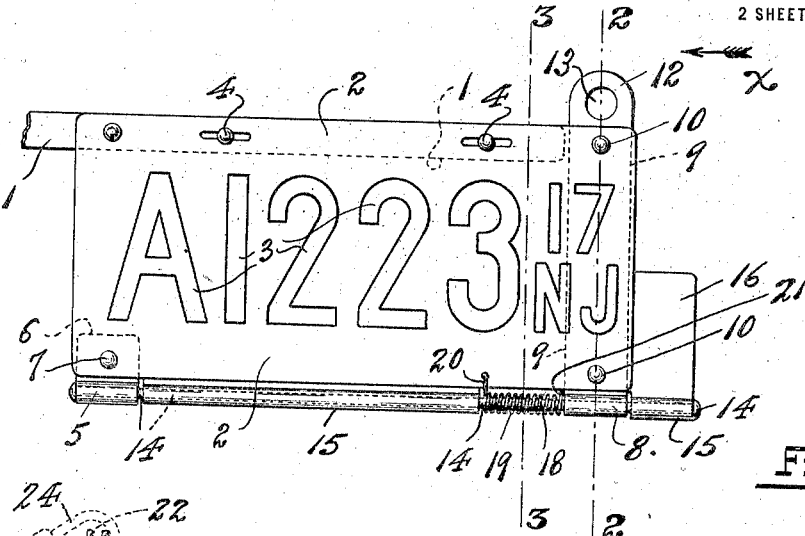
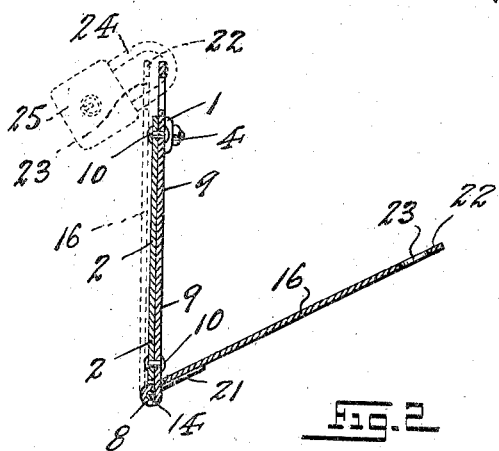
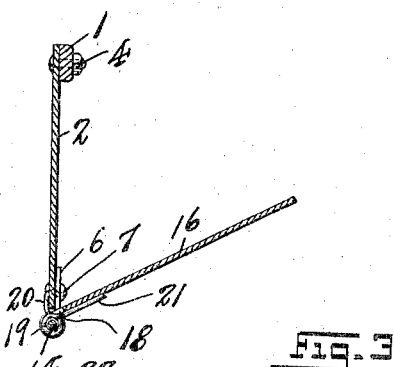
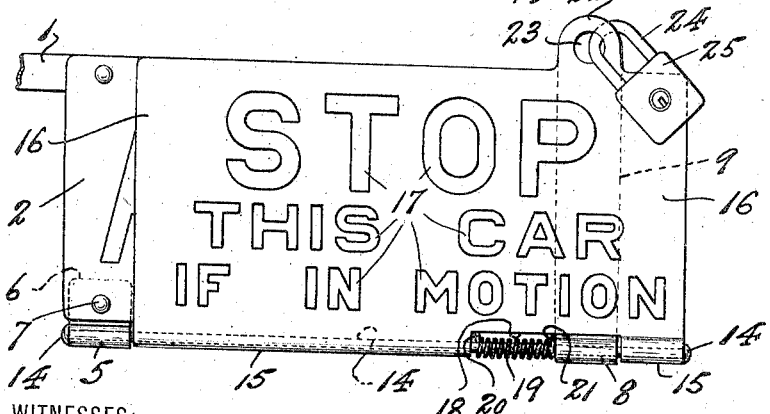
WITNESSES:
INVENTOR
Thomas W. McNally, Jr.,
BY
Frantzel and Richards
ATTORNEYS

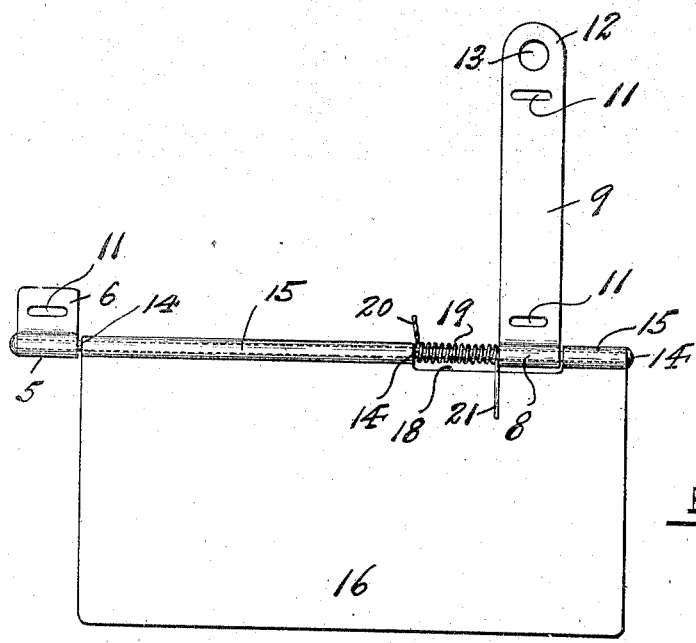
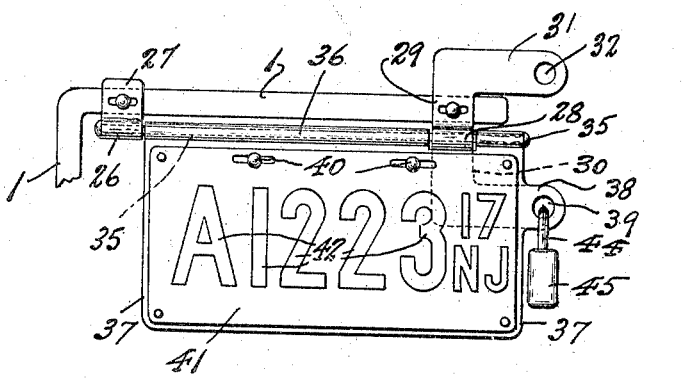
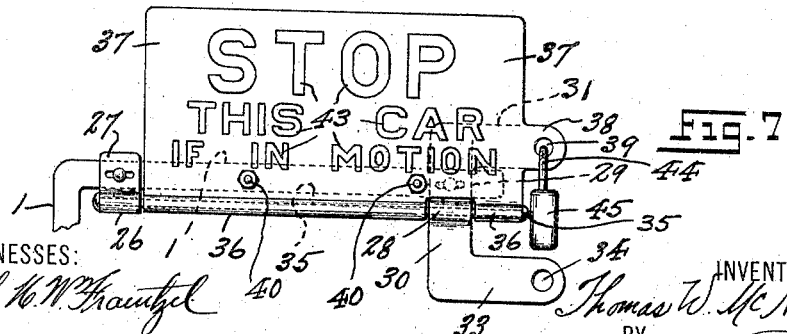

UNITED STATES PATENT OFFICE.

THOMAS W. McNALLY, JR., OF NEWARK, NEW JERSEY, ASSIGNOR OF ONE-HALF TO OLIVER DYSON, OF KEARNEY, NEW JERSEY.

THEFT-PREVENTION DEVICE FOR AUTOMOBILES.

1,249,798.

Specification of Letters Patent.

Patented Dec. 11, 1917.

Application filed March 9, 1917. Serial No. 153,567.

*To all whom it may concern:*

Be it known that I, THOMAS W. MCNALLY, Jr., a citizen of the United States, residing at Newark, in the county of Essex and State of New Jersey, have invented certain new and useful Improvements in Theft-Prevention Devices for Automobiles; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in theft-prevention devices for automobiles, motorcycles, and the like; and the invention has reference, more particularly, to a simple, cheap, and easily manipulated device, adapted to be associated with the State license plate with which all motor vehicles are required to be equipped, and which, when in operative use, conceals the license plate and exposes a warning inscription or sign indicating that the vehicle is being operated or used by someone not having proper authority from the owner.

The invention has for its principal object to provide a novel theft-prevention device adapted to be associated with the State license plate on a motor vehicle, in such a way, that it may be manipulated to both conceal the license number and at the same time display a warning inscription or sign which will attract the attention of police authorities or others to the fact that the car or vehicle, if in motion, is being operated without the consent of the owner, and without a proper display of the license number, as is usually legally required.

A further object of the present invention is to provide a locking means in connection with the novel theft-prevention device which will permit of the same to be locked or secured in its operative condition so that the same cannot be tampered with.

A further object of the present invention is to provide a theft-prevention device of such character that when the same is locked in operative condition, it in no way prevents the operation of the running or operating mechanism of the vehicle, and consequently does not interfere with the necessary movement of the car in cases of necessity, such for example, as the removal of the vehicle from the danger zone of a fire, when the vehicle is parked in a street in which a fire breaks out.

Other objects of the present invention, not at this time more particularly enumerated, will be clearly understood from the following detailed description of the same.

With the various objects of the present invention in view, the same consists, primarily, in the novel theft-prevention device hereinafter set forth; and the invention consists, furthermore, in the novel arrangements and combinations of the several devices and parts, as well as in the details of the construction of the same, all of which will be more fully described in the following specification, and then finally embodied in the claims appended thereto.

The invention is clearly illustrated in the accompanying drawings, in which:—

Figure 1 is a face view of a motor vehicle license plate equipped with the novel theft-prevention device made according to and embodying the principles of my present invention, the same being shown in normal inoperative position; Fig. 2 is a vertical cross section taken on line 2—2 in said Fig. 1 looking in the direction of the arrow $x$, and showing in dotted representation the operative position of the theft-prevention device; Fig. 3 is another vertical cross section taken on line 3—3 in said Fig. 1, also looking in the direction of the arrow $x$; Fig. 4 is a face view showing the theft-prevention device in its operative relation to the vehicle license plate, and locked in such operative position; and Fig. 5 is a detail face view of the novel theft-prevention device detached from the vehicle license plate.

Fig. 6 is a face view of a slightly modified construction of my novel theft-prevention device, the same being shown in normal inoperative position; and Fig. 7 is a similar view showing the theft-prevention device in operative position.

Similar characters of reference are employed in all of the hereinabove described views to indicate corresponding parts.

Referring now to the said drawings, the reference character 1 indicates a portion of the supporting bracket with which motor vehicles are usually provided for the purpose of securing the State license number plate upon the vehicle. The reference character 2 indicates a State license number plate, inscribed with a license number 3, and secured to the bracket 1 by means of bolts, rivets, screws or any other desired form of fastening means 4.

Figs. 1 to 5 inclusive of the drawings illustrate one form of construction comprising my novel theft prevention device. In this construction I provide a journal or bearing member 5 provided with an upwardly extending perforated ear or lug 6, by means of which said journal or bearing member 5 may be attached to the license plate 2 with rivets, bolts or other desirable fastening means 7, so that the same projects downwardly from the lower left hand corner of said license plate 2, and extends parallel to the lower edge thereof.

The reference character 8 indicates a second journal or bearing portion provided with an upwardly extending perforated vertical strap or bar portion 9, which extends upwardly across the back of the license plate 2, and which is attached to the license plate with rivets, bolts or other desirable fastening means 10, so that said journal or bearing-portion 8 projects downwardly from the lower right hand corner of said license plate 2, and extends parallel to the lower edge thereof.

The perforations of the respective ear or lug 6 and strap or bar-portion 9, are preferably in the form of laterally disposed slots 11, so that adjustment of the said parts relative to the perforations usually provided in State license number plates may be easily accomplished to register said slots 11 therewith to quickly and easily permit of the fastening means being passed therethrough.

The said vertical strap or bar-portion 9 is longer than the width of the license plate 2, and terminates in a tongue-portion 12 provided with an opening 13, for purposes presently to be described.

Extending through and between the respective journal or bearing-portions 5 and 8 is a pintle-rod or hinge-pin 14. Pivotally supported upon said pintle-rod or hinge-pin 14 by means of a hinge-knuckle 15 is a signal-plate 16, one face of which is inscribed with a warning signal or stop-notice 17, such, for example, as "Stop this car if in motion" or any other suitable and appropriate signal phrase. Preferably said hinge-knuckle 15 is cut away, as at 18, to allow the same both to straddle said journal or bearing-portion 8, and to provide for an exposed portion of the pintle-rod or hinge-pin 14 upon which is arranged the body of a spiral spring 19, one arm 20 of which engages the license plate 2, and the other arm 21 of which engages the signal plate 16. The tension of said spring 19, when exercised upon the signal plate 16, tends to normally maintain the same turned back and behind the license plate 2, and thus positioned in concealed inoperative relation to said license plate 2.

Projecting upwardly from the free longitudinal edge of said signal plate 16 is a tongue-portion 22 provided with an opening 23, the same being so positioned that when the signal plate 16 is turned to position the same over the face of the license plate 2, said opening 23 registers with the opening 13 of said tongue-portion 12 of the strap or bar portion 9.

When a motor vehicle, equipped with my novel construction of theft-prevention device, is parked in the street or other public place, the owner or driver, before leaving the same, turns the signal plate 16 upwardly over the license number plate 2, thus concealing the license number thereof, and at the same time exposing the warning signal or stop notice 17. The respective tongues 12 and 22 with their openings 13 and 23 being registered together when the signal plate 16 is thus moved to operative position, the hasp 24 of a suitable lock 25 may be passed through the openings 13 and 23, thus serving to lock and retain the signal plate 16, against the tension of the spring 19, in such operative position. If the vehicle is driven without authority or by a thief, attention is immediately attracted to the fact that the license number is concealed, which in itself is unlawful, and secondly, the warning signal or stop-notice 17 at once notifies police officers or others that the vehicle is being driven without authority, consequently the driver may be stopped, questioned and if found attempting to steal the vehicle is readily detected. It will thus be apparent that my novel theft prevention device will not only lead to the detection and arrest of a thief, but the same is of such a character, mechanically, that it does not of itself prevent the movement of the standing vehicle, if circumstances render its removal necessary, as, for example, when a fire in the vicinity of the standing vehicle renders its removal necessary.

The form of the device is such that it may be sold independently and may be readily attached to any one of the usual or ordinary forms of license number plates.

Referring now to Figs. 6 and 7 of the accompanying drawings, I have illustrated therein a slightly modified construction of my novel theft-prevention device. In this construction, I provide a journal or bearing-portion 26 having a perforate lug 27 for securing the same to the bracket 1, and I also provide a second journal or bearing-portion 28 provided with an upwardly extending bar 29 perforated for attachment to said bracket 1, and a downwardly extending bar 30. The upper free end of said bar 29 terminates in a laterally and outwardly extending arm or tongue 31 having an eye or opening 32 near its end, and, in like manner, the lower free end of said bar 30 terminates in a laterally and outwardly extending arm or tongue 33 having an eye or opening 34 near its end. The reference character 35 indicates a pintle-rod or hinge-pin which extends through and is supported by the respective journal or bearing-portions 26 and 28. Pivotally supported upon said pintle-rod or hinge-pin 35, by means of its hinge-knuckle 36, is a signal-plate 37. Extending outwardly from the end of said signal-plate 37 is a tongue or lug 38 having an opening or eye 39. Secured upon one face of said signal-plate 37 by means of rivets, bolts or other desirable form of fastening means 40, is a license number plate 41 having inscribed thereon the usual license number 42. Inscribed upon the opposite face of the signal plate 37 is a suitable warning signal or stop-notice 43. Normally the signal plate 37 is maintained in such position as to expose properly the license plate 41, in which case the tongue or lug 38, with its opening or eye 39, is registered with the arm or tongue 33 and its eye or opening 34, so that the hasp 44 of a suitable lock 45 may be secured through said registered eyes, thus retaining the parts in such normal position. When the driver or owner leaves the vehicle standing, the lock 45 is released, and the signal plate 37 is swung upward to turn the same over, thus concealing the license number and exposing the warning signal or stop notice 43, in which case the tongue or lug 38, with its opening or eye 39, is registered with the arm or tongue 31 and its eye 32, so that the hasp 44 of said lock 45 may be secured through the registered eyes, thus locking the parts in operative position, thus providing for the theft-prevention and detection results already above described.

While I have shown a detachable locking means for the signal plate in both of the above described constructions, I do not wish myself understood as limiting my invention to such means, since any locking means of either permanent or detachable character may be employed to hold the signal-plate without departing from the scope of my present invention.

I am also aware that some changes may be made in the various arrangements and combinations of the several devices and parts of my device, as well as in the details of the construction of the same, without departing from the scope of my present invention as defined in the appended claims. Hence, I do not limit my invention to the exact arrangements and combinations of the various devices and parts as set forth in the foregoing specification, nor do I confine myself to the exact details of the construction of said parts as illustrated in the accompanying drawings.

I claim:—

1. In a device of the kind described, a pivoted signal plate adapted when swung to one position to display a State license number, and when swung to another position to conceal said State license number and display a stop notice or warning, and means for locking said signal plate in either one or the other position.

2. In a device of the kind described, the combination with a State license number plate of bearing portions secured thereto, a hinge-pin extending through said bearing portions, a signal plate pivoted upon said hinge-pin having inscribed upon one face a stop notice or warning, said signal-plate being adapted to be turned over the face of said license plate to conceal the license number and to display said stop notice or warning, and means for locking said signal plate in such operative position, comprising a vertical strap portion extending upwardly from one bearing portion and secured to the back of said license plate, a tongue portion provided with an eye connected with the upper end of said strap portion so as to project beyond the edge of said license plate, said signal plate having a tongue portion provided with an eye adapted to register with said first mentioned tongue portion and its eye, and a lock mechanism coöperating with said registered tongue portions to retain the same together.

3. In a device of the kind described, the combination with a State license number plate of bearing portions secured to the lower marginal edge thereof, a hinge-pin extending through said bearing portions, a signal plate pivoted upon said hinge-pin having inscribed upon one face a stop notice or warning, said signal plate having a cutaway portion in its pivoted edge adapted to disclose a portion of said hinge-pin, a coiled spring mounted on said exposed portion of said hinge-pin having a pair of spring arms, one of said spring arms being adapted to engage said license plate and the other of said spring arms being adapted to engage said signal plate, the tension of said coiled spring tending to maintain said signal plate in normal inoperative position, said signal plate being adapted to be turned over the face of said license plate to conceal the license number and to display said stop notice or warning, and means for locking said signal plate in such operative position.

4. In a device of the kind described, the combination with a State license number plate of bearing portions secured to the lower marginal edge thereof, a hinge-pin extending through said bearing portions, a signal plate pivoted upon said hinge-pin having inscribed upon one face a stop notice or warning, said signal plate having a cutaway portion in its pivoted edge adapted to disclose a portion of said hinge-pin, a coiled spring mounted on said exposed portion of said hinge-pin having a pair of spring arms, one of said spring arms being adapted to engage said license plate and the other of said spring arms being adapted to engage said signal plate, the tension of said coiled spring tending to maintain said signal plate in normal inoperative position, said signal plate being adapted to be turned over the face of said license plate to conceal the license number and to display said stop notice or warning, and means for locking said signal plate in such operative position, comprising a vertical strap portion extending upwardly from one bearing portion and secured to the back of said license plate, a tongue portion provided with an eye connected with the upper end of said strap portion so as to project beyond the edge of said license plate, said signal plate having a tongue portion provided with an eye adapted to register with said first mentioned tongue portion and its eye, and a lock mechanism coöperating with said registered tongue portions to retain the same together.

In testimony, that I claim the invention set forth above I have hereunto set my hand this 6th day of March, 1917.

THOMAS W. McNALLY, Jr.

Witnesses:
 FRED C. FRAENTZEL,
 FRED'K H. W. FRAENTZEL.

Copies of this patent may be obtained for five cents each, by addressing the "Commissioner of Patents, Washington, D. C."